United States Patent [19]
Yamasaki et al.

[11] Patent Number: 4,800,554
[45] Date of Patent: Jan. 24, 1989

[54] DISK MAGAZINE

[75] Inventors: Hidetoshi Yamasaki, Atsugi; Masae Murata, Yamato, both of Japan

[73] Assignee: Victor Company of Japan, Limited, Kanagawa, Japan

[21] Appl. No.: 102,194

[22] Filed: Sep. 29, 1987

[30] Foreign Application Priority Data

Oct. 1, 1986 [JP] Japan .................................. 61-151057
Oct. 1, 1986 [JP] Japan .................................. 61-151059

[51] Int. Cl.$^4$ ...................... G11B 17/00; G11B 23/04
[52] U.S. Cl. ..................................... 369/291; 369/36; 369/39; 369/77.2; 360/92; 360/98.06; 360/99.07
[58] Field of Search ...................... 369/36, 37, 38, 39, 369/77.2, 291; 360/92, 98, 133

[56] References Cited

U.S. PATENT DOCUMENTS

| | | | |
|---|---|---|---|
| 4,682,313 | 7/1987 | Miyake | 369/39 |
| 4,691,309 | 9/1987 | Suzuki | 369/38 |
| 4,701,900 | 10/1987 | Hasegawa et al. | 369/36 |
| 4,768,116 | 8/1988 | Watanabe | 360/132 |

Primary Examiner—Steven L. Stephan
Attorney, Agent, or Firm—Jordan and Hamburg

[57] ABSTRACT

A disk magazine for use with an audio and a video instrument of the type using disks and accommodating a stack of disks therein includes generally rectangular trays each of which is bodily removable from a casing of the magazine through an opening, which is formed only through the front end of the casing. Each tray is guided by horizontally aligned ones of tray guides which are arranged in steps on the inner periphery of each of opposite side walls of the casing with respect to an intended direction of tray insertion. Whether or not the tray is inserted in a correct position into the casing is checked to prevent the tray from being loaded in a position other than the correct one.

17 Claims, 17 Drawing Sheets

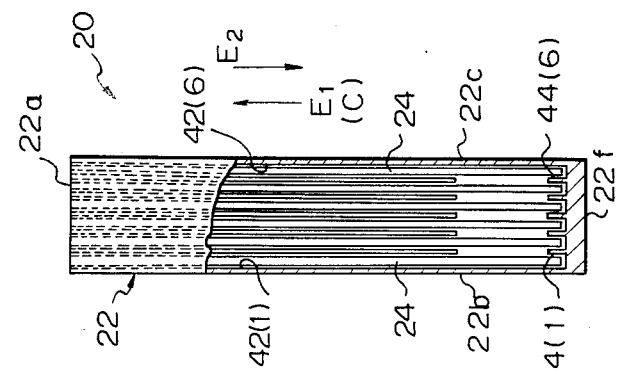
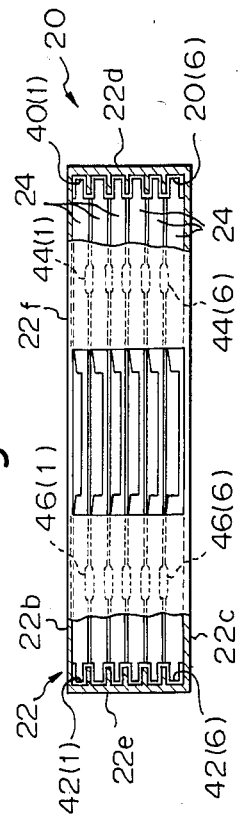
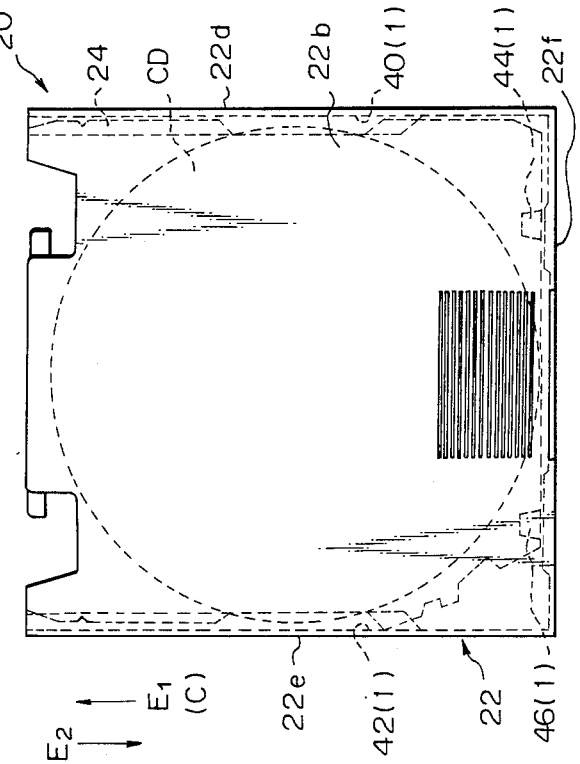

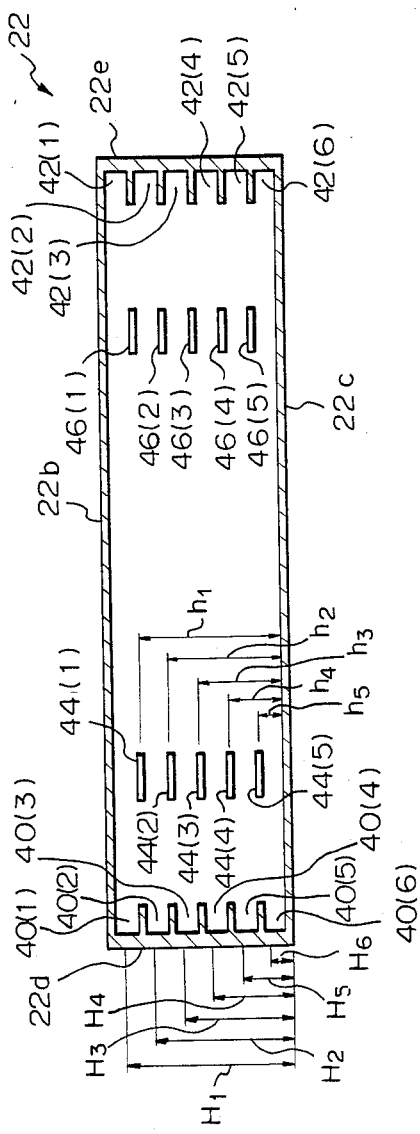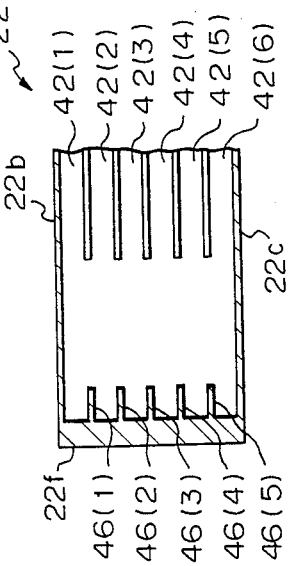
Fig. 10
Fig. 11

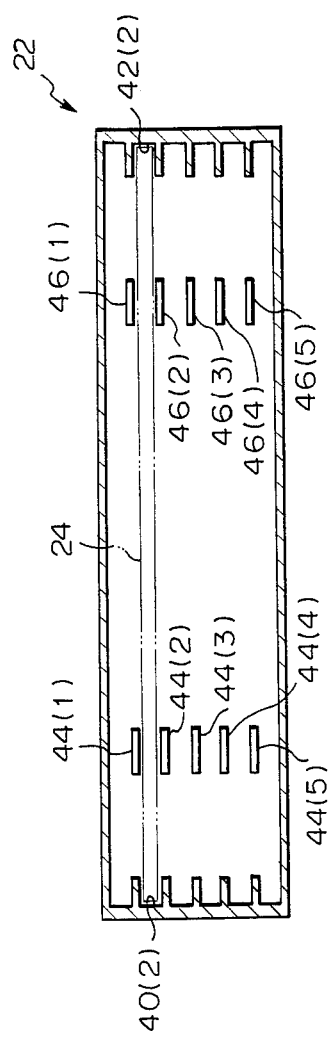
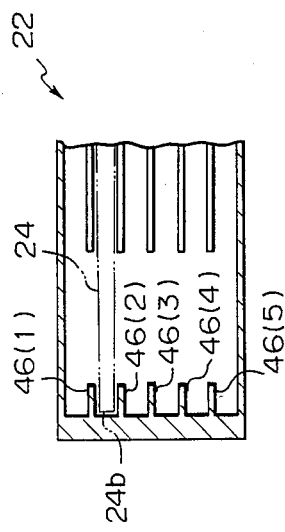
Fig. 12
Fig. 13

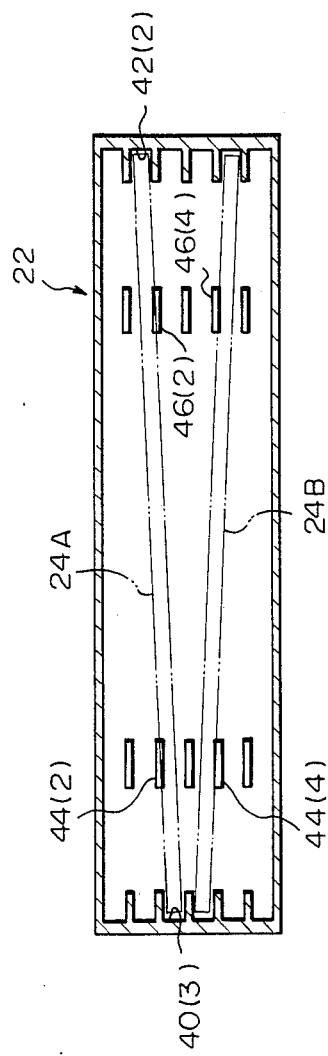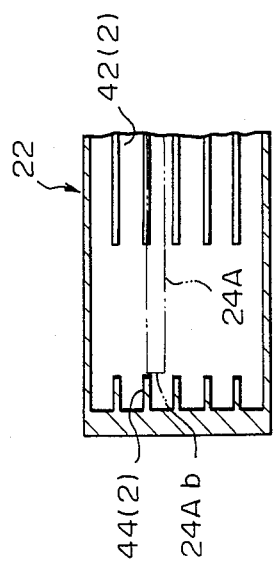

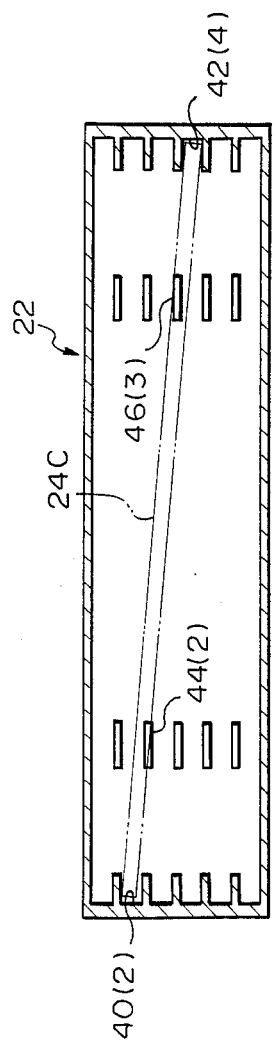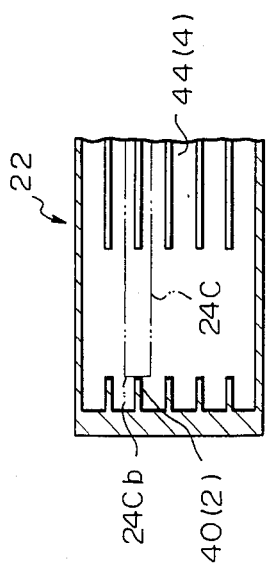

DISK MAGAZINE

BACKGROUND OF THE INVENTION

The present inventin relates to a disk magazine for use with an audio and a video playback device which use disks and, more particularly, to a disk magazine applicable to an automatic disk selection and playback mechanism which is installed in such a playback device.

In a compact disk playback device, for example, a magazine which is loaded with a stack of compact disks is mounted in a body of the playback device so that the disks may be sequentially selected and played back. Because this type of compact disk playback device allows multiple disks to be loaded at a time to sequentially play them back, it frees a person from troublesome operations otherwise needed to take out a disk from the magazine at the end of playback, put another disk in the magazine, and repeat such a procedure for every disk loaded in the magazine.

A prior art disk magazine of the type described is made up of a casing, and trays each being loaded with a compact disk. Each of the trays is rotatably connected at its one corner to one corner of the casing by a pin. The magazine with the trays and disks mounted therein is inserted into a disk playback device through an opening of the latter. When any of the trays is rotated about the pin to a predetermined positon in the playback device, the disk loaded on that tray is moved out of the casing to be played back by the playback device. On completion of playback, the tray is rotated in the opposite direction about the pin until the disk has been received in the magazine again.

However, such a rotatable tray type disk magazine has various problems left unsolved, as enumerated below.

(1) Even though the tray may be moved out of the casing, it still remains physically connected to the casing and does not become independent, or free. Hence, the connection of the tray to the casing is apt to become unstable resulting in, in the worst case, the breakage of the tray.

(2) Usually, a disk is loaded in the tray by holding the tray by one hand and the disk by the other hand and, then, putting the disk on the tray. A drawback with the prior art magazine is that the casing obstructs the handling of the tray, and that because both the casing and the tray have to be held by one hand at the same time, the tray cannot be securely gripped. For these reasons, it is not easy for a person to load a disk in the tray and, therefore, in the magazine.

(3) The casing is open at at least its two sides in order to allow the tray to be rotated as stated earlier. Such open sides of the casing would allow dust and others to easily enter the casing.

(4) Because the tray is simply supported at its one corner by the casing through a pin, the free end of the tray is easily displaceable in the vertical direction, especially when the tray is rotated within the playback device to the outside of the casing. Should the tray be rotated in an inclined position, the surface of the disk would be rubbed during the movement of the disk into the casing.

(5) An extra space great enough to allow the tray to be rotated out of the casing should be provided in the playback device, obstructing the miniaturization of the playback device.

SUMMARY OF THE INVENTION

It is, therefore, an object of the present invention to provide a disk magazine for a disk playback device which allows a disk to be easily loaded on a tray which is disposed in a casing.

It is another object of the present invention to provide a disk magazine for a disk playback device which prevents a tray from being inserted in incorrect positions into a casing.

It is another object of the present invention to provide a disk magazine for a disk playback device which prevents a disk surface from being scratched or otherwise damaged while a disk is being loaded on a tray in a casing.

It is another object of the present invention to provide a disk magazine for a disk playback device having a rigid structure.

It is another object of the present invention to provide a disk magazien which eliminates the ingress of dust and others into a casing.

It is another object of the present invention to provide a disk magazine for a disk playback device which promotes the miniaturization of the playback device.

It is another object of the present invention to provide a generally improved disk magazine for a disk playback device.

A disk magazine receiving a plurality disks therein in a coaxial arrangement and detachably mounted in a disk playback device having a function of selectively playing back the disks of the present invention comprises a plurality of rectangular trays each having a disk seat portion for loading one of the disks, a casing provided with an opening which is formed only through a front wall of the casing with respect to an intended direction of tray insertion, and a plurality of tray guide members arranged in steps on inner periphery of each of opposite side walls with respect to the intended direction of tray insertion, the tray guide members on the opposite side walls facing each other, each of the trays being guided at opposite sides thereof by any of the tray guide members on the opposite side walls which assume a same step, and a means for deciding whether or not any of the trays is correctly inserted into the casing.

The above and other objects, features and advantages of the present invention will become more apparent from the following detailed description taken with the accompanying drawings.

BRIEF DESCRIPTION OF THE DRAWINGS

FIG. 3 is a partly sectional front view of the disk magazine as shown in FIG. 2;

FIG. 4 is a plan view of the disk magazine as shown in FIG. 2;

FIG. 5 is a side elevation of the disk magazine as shown in FIG. 2;

FIG. 10 is an enlarged section along line X—X of FIG. 2, showing tray guides and incorrect insertion preventing lugs which are provided in a casing of the disk magazine of FIG. 2;

FIG. 11 an enlarged section along line XI—XI of FIG. 2, showing the tray guides and the lugs;

FIGS. 12 and 13 are views showing a condition in which a tray is inserted in a predetermined correct position;

FIGS. 14 and 15 are views showing a tray which is inserted by using the right and left tray guides which are one step deviated from each other;

FIGS. 16 and 17 showing a condition in which a tray is inserted by using the right and left tray guides which are two steps deviated from each other;

DESCRIPTION OF THE PREFERRED EMBODIMENTS

Figure 1A:
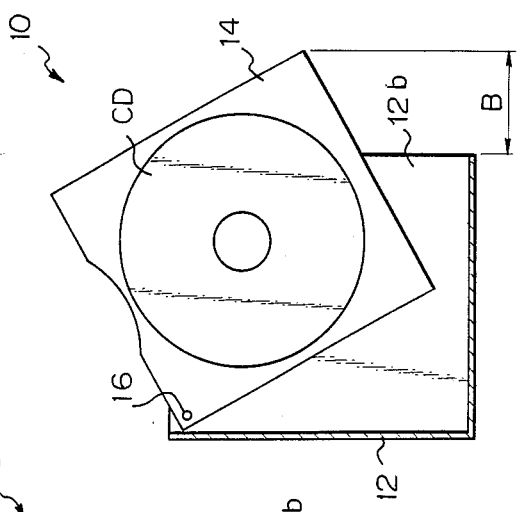
FIGS. 1A, 1B and 1C are schematic views each showing a tray of a prior art disk magazine in a particular position relative to a casing.
Figure 1B:
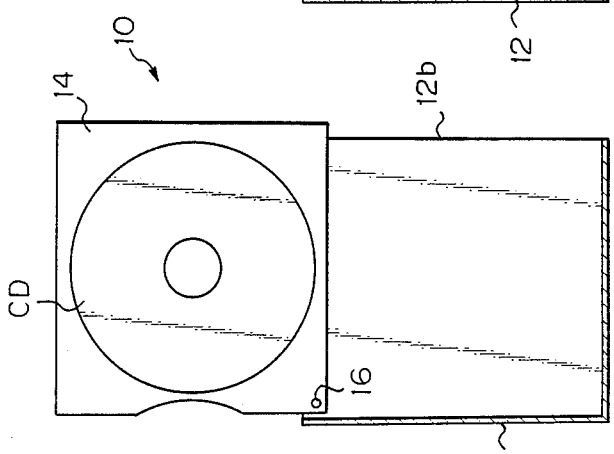
Figure 1C:
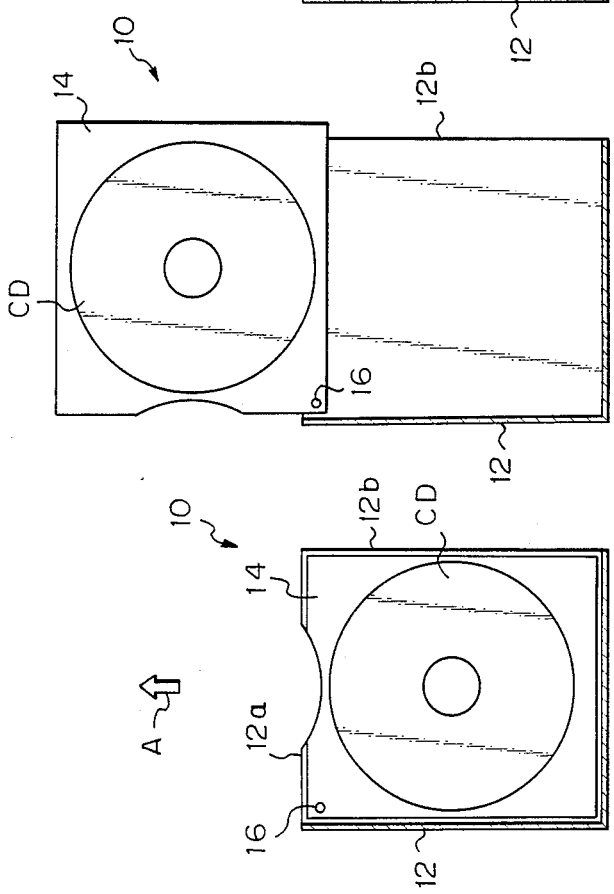

To better understand the present invention, a brief reference will be made to a prior art disk magazine for a disk playback device, shown in FIGS. 1A to 1C. As shown, the prior art disk magazine 10 which is applicable to a compact disk playback device is constituted by a casing 12 and a plurality of trays 14 (only one being shown) each being loaded with a compact disk CD. The tray 14 is rotatably connected at one of its corners to a corner of the casing 12 by a pin 16. FIG. 1A shows the tray 14 and disk CD fully received in the casing 12. In this condition, the magazine 10 is inserted into a disk playback device in a direction indicated by an arrow A. While the magazine 10 is loaded in the playback device, the tray 14 is rotated counterclockwise as shown in FIG. 1C until it reaches a predetermined position as shown in FIG. 1B In the position of FIG. 1B, the disk CD is located outside of the casing 12 and ready to be played back. After the playback, the tray 14 is rotated clockwise to regain the position shown in FIG. 1A.

A problem with the rotatable tray type magazine 10 is that even if the tray is moved out of the casing 12, it still remains connected to the casing 12, i.e., it fails to become entirely free. Usually, the disk CD is put on the tray 14 by holding the tray 14 by one hand and the disk CD by the other hand. In the magazine 10, however, the casing 12 obstructs the access to the tray 14 and, in addition, both the casing 12 and the tray 14 have to be gripped by one hand at the same time. This prevents the tray 14 from being securely held and, thereby, makes it difficult to load the disk CD on the tray 14. Another drawback is that the casing 12 which is open at two sides 12a and 12b allows dust and others to enter the casing 12 easily. Furthermore, because the tray 14 is supported only at its one corner by the pin 16, in the position shown in FIG. 1B, the free end of the tray 14 is easily displaceable in the vertical direction. Should the tray 14 be rotated in an inclined position, the surface of the disk CD would be rubbed in the event of the movement of the disk CD into the casing 12. As regards the support structure for the tray 14, it cannot readily be provided with rigidity and, hence, it is easy to fail. In addition, when the casing 12 is set in the playback device, a space dimensioned B as shown in FIG. 1C has to be available in that portion of the playback device which faces the opening 12b of the casing 12, obstructing the miniaturization of the playback device.

Preferred embodiments of the present invention will be described hereinafter which are free from the various drawbacks particular to the prior art disk magazine as discussed above. While the embodiments of the present invention will be described in relation to a compact disk playback device, such is only illustrative and not restrictive.

Figure 6:
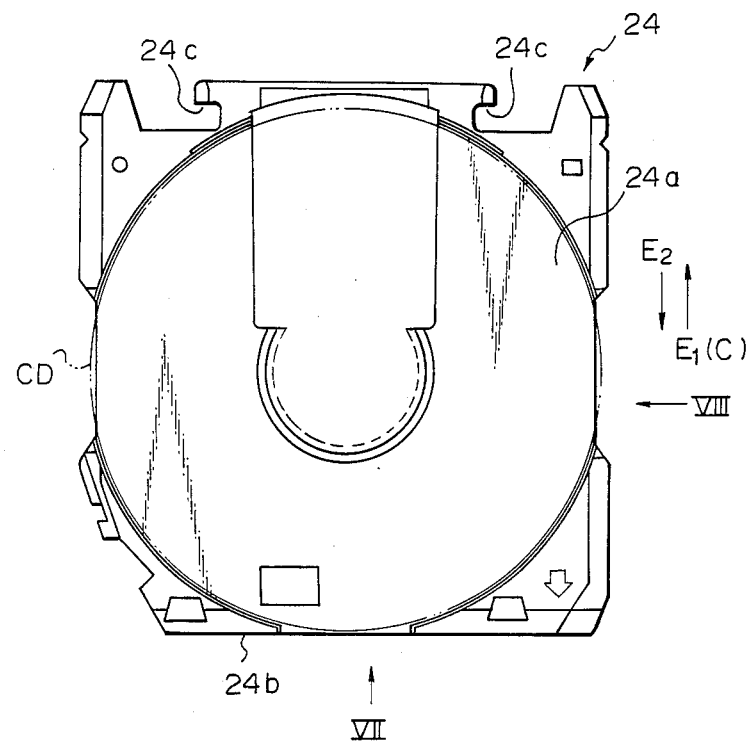
FIG. 6 is a plan view of a tray of the disk magazine as shown in FIG. 1.
Figure 8:
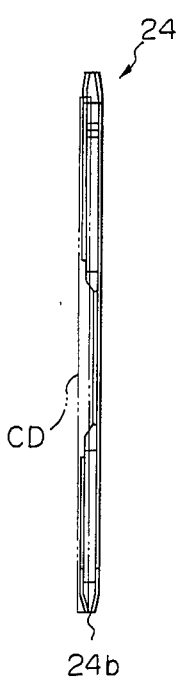
FIG. 8 is a view as seen in a direction indicated by an arrow VIII in FIG. 7.
Figure 7:
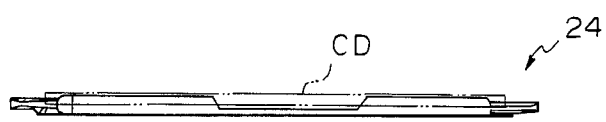
FIG. 7 is a view of the tray as seen in a direction indicated by an arrow VII in FIG. 7.

Referring to FIGS. 2 to 5, a disk magazine embodying the present invention is shown and generally designated by the reference numeral 20. As shown, the disk magazine 20 comprises a casing 22 and, for example, six trays 24 which are received in the casing 24 one upon another. Loaded with one disk CD, each tray 24 is movable into and out of the casing 22 in directions indicated by arrows $E_1$ and $E_2$, respectively. The tray 24 gains an entirely free state when taken out of the casing 22. The disks CD in the individual trays 24 are positioned coaxially to each other. FIGS. 6 to 8 show the tray 24.

Figure 9:
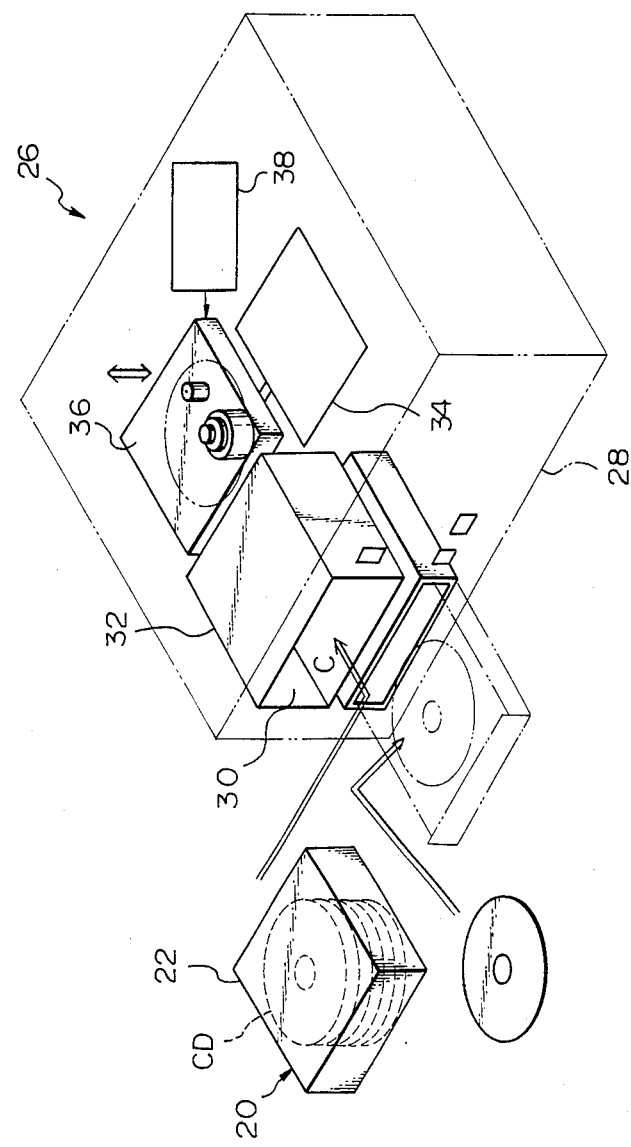
FIG. 9 is a view schematically showing a compact disk playback device to which the disk magazine of FIG. 2 is applicable.

As shown in FIG. 9, the disk magazine 20 is inserted into a compact disk playback device 26 as indicated by an arrow C through an opening 30 which is formed through a front panel 28 of the device 26, until it becomes fully loaded in a magazine loading section 32. The playback device 26 includes a disk pull-out and return mechanism 34, a disk playback unit 36, and a mechanism 38 for moving the disk playback unit 36 in a direction indicated by an arrow D. With such mechanisms and units, the playback device 26 selects and plays back any one of the compact disks CD which are loaded in the magazine 20.

As shown in FIGS. 2 to 5, the casing 22 is made of synthetic resin and provided with a box-like configuration. The front end 22a of the casing 22 with respect to an intended direction of tray insertion into the playback device 26, i.e., direction C is open. Specifically, the casing 22 comprises a top wall 22b, a bottom wall 22c, side walls 22d and 22e, and a rear wall 22f as named with respect to the intended direction of tray insertion. It is to be noted that the rear wall 22f usually faces the opening 22a of the casing 22 and constitutes the front face of the magazine 20.

As shown in FIGS. 3 and 5 and, also, in FIGS. 10 and 11 in an enlarged scale, six tray guides 40 (1) to 40 (6) and six tray guides 42 (1) to 42 (6) are provided on, respectively, the inner surfaces of the side walls 22e and 22d of the casing 22 to face each other. Each having a channel-like configuration, the paired tray guides 40 (1) to 40 (6) and 42 (1) to 42 (6) are respectively positioned at heights $H_1$ to $H_6$ as measured from the bottom plate 22c. Lugs 44 (1) to 44 (5) and 46 (1) to 46 (5) adapted to prevent incorrect insertion of trays are provided on the inner surface of the rear wall 22f of the casing 22 and adjacent to the side walls 22d and 22e, respectively.

The lugs 44 (1) and 46 (1) are situated at a height $h_1$ intermediate between the height $H_1$ of the first-step tray guides 40 (1) and 42 (1) and the height $H_2$ of the second-step tray guides 40 (2) and 46 (2). Likewise, the lugs 44 (2) and 42 (2) are located at a height $h_2$ intermediate between the second-step tray guides 40 (2) and 42 (2) and the third-step tray guides 40 (3) and 42 (3), the lugs 44 (3) and 46 (3) at a height $h_3$ intermediate between the third-step tray guides 40 (3) and 42 (3) and the fourth-step tray guides 40 (4) and 42 (4), the lugs 44 (4) and 46 (4) at a height $h_4$ intermediate between the fourth-step tray guides 40 (4) and 42 (4) and the fifth-step tray guides 40 (5) and 42 (5), and the lugs 44 (5) and 46 (5) at a height $h_5$ between the fifth-step tray guides 40 (5) and 42 (5) and the sixth-step tray guides 40 (6) and 42 (6).

Figure 2:
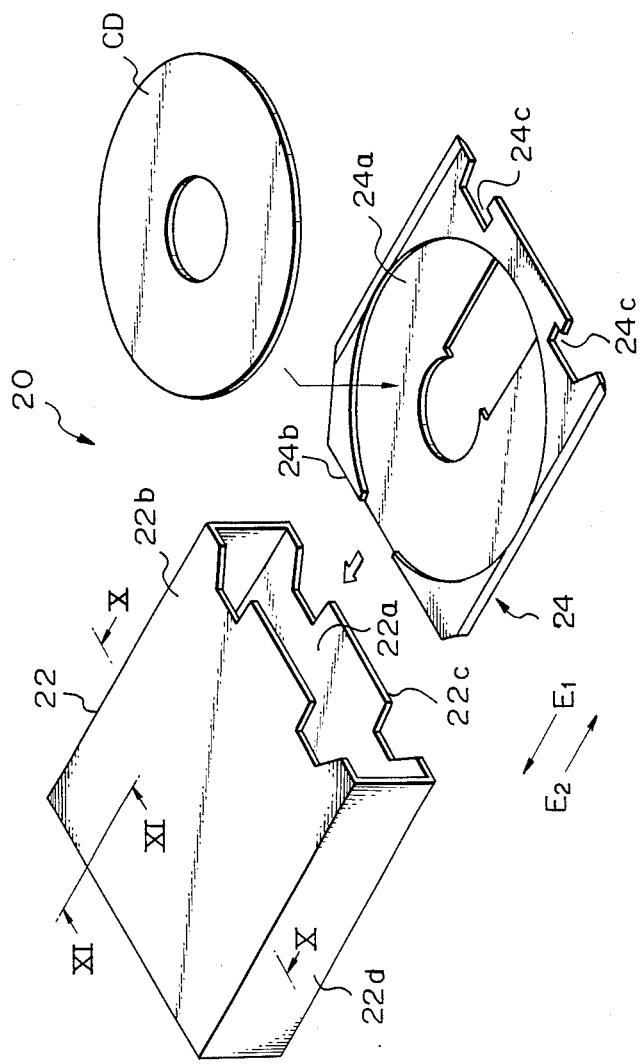
FIG. 2 is an exploded perspective view of a disk magazine embodying the present invention.

As shown in FIGS. 6 and 8, the tray 24 has a generally rectangular configuration and is provided with a disk seat portion, or shallow recess, 24a. The disk CD is placed in the disk seat portion 24a with its displacement in the radial direction restricted. To load the disk CD in the magazine 10, the disk CD is laid in the disk seat portion 24a of the tray 24 first, as shown in FIG. 2. In this instance, because the tray 24 is physically independent of the casing 22, a person is allowed to place the disk CD on the tray 24 by holding it by one hand while securely supporting the tray 24 by the other hand. Such a disk loading operation is far easier than in the prior art in which a tray is not entirely free, as stated earlier. Then, the tray 24 is inserted deep into the casing 22 through the opening 22a in the direction $E_1$ with its edge 24b, which extends perpendicular to the direction of tray insertion, positioned at the front and with its laterally opposite sides guided by the tray guides of the same height, e.g. tray guides 40 (2) and 42 (2). Because the tray 24 is guided at opposite sides by the aligned tray guides as states above, it is inserted forcibly in a horizontal position from the beginning so that the disk CD is prevented from rubbing itself against the overlying tray 24 to be thereby scratched or otherwise damaged. Further, because the casing 22 is not open except for the opening 22a and, yet, the opening 22a is closed when all of the six trays 24 are loaded in the casing 22, the ingress of dust and others into the magazine 20 is substantially averted.

When the tray 24 is correctly inserted into the magazine 20 with its laterally opposite sides guided by the aligned tray guides, its front edge 24b does not collide against the lugs 44 (1) to 44 (5) and 46 (1) to 46 (5), as shown in FIGS. 3, 5, 12 and 13. Specifically, the front edge 24b enters the interstice between the vertically nearby lugs so that one can insert the tray 24 to a predetermined deepest position in the magazine 20.

FIGS. 14 and 15 show a condition in which the right and left tray guides selected are one step deviated from each other. Specifically, a tray 24A is inserted inclined leftward downward with its right and left sides guided by the tray guides 42 (2) and 40 (3), respectively. In this condition, the front edge 24Ab of the tray 24A collides against the lugs 44 (2) and 46 (2) preventing the tray 24A from being inserted any further. Likewise, a tray 24B which is inserted inclined rightward downward becomes unable to advance when its front edge abuts against the lugs 44 (4) and 46 (4).

FIGS. 16 and 17 show a situation in which the right and left tray guides selected are two steps deviated from each other. A tray 24C is shown guided by the tray guide 40 (2) at its left side and by the tray guide 42 (4) at its right side in a rightwardly downwardly inclined position. In this case, the front edge 24Cb of the tray 24C abuts against the lugs 44 (2) and 46 (3) to prevent the tray 24C from advancing any further into the casing 22.

In this manner, when the tray 24 is loaded in the casing 22 in an incorrect position, the collision of the tray front edge against the lugs surely alerts the operator to the incorrect insertion. All that is required then is pulling the tray 24 out of the casing 22, reorienting the tray 24, and inserting it again into the casing 22. Such positively prevents the magazine 20 from being mounted in the playback device 24 with any of the trays 24 held in an incorrect position.

Further, in the playback device 26, the tray 24 is pulled out in the direction $E_2$ through the opening 22a of the casing 22 with two notches 24c thereof, FIG. 2, retained by the disk pull-out and return mechanism 34. Hence, it is needless to provide an extra space otherwise needed at the side of the loading section 32 of the playback device 26 for pulling out a tray, whereby the playback device 26 may be miniaturized.

Figure 18:
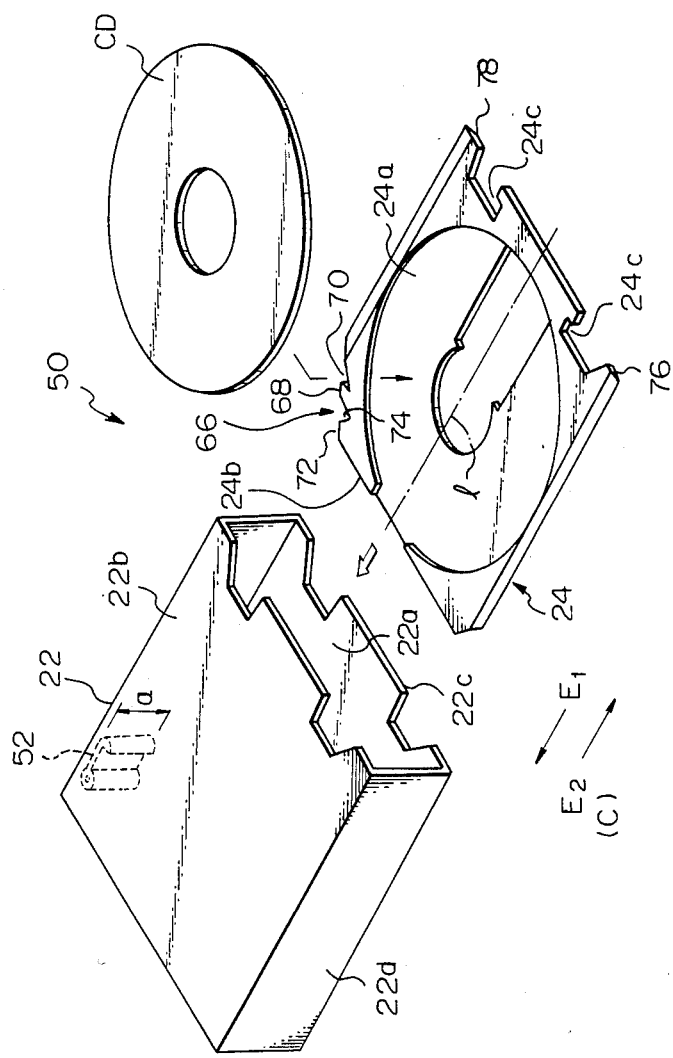
FIG. 18 is an exploded perspective view showing another embodiment of the present invention.
Figure 19:
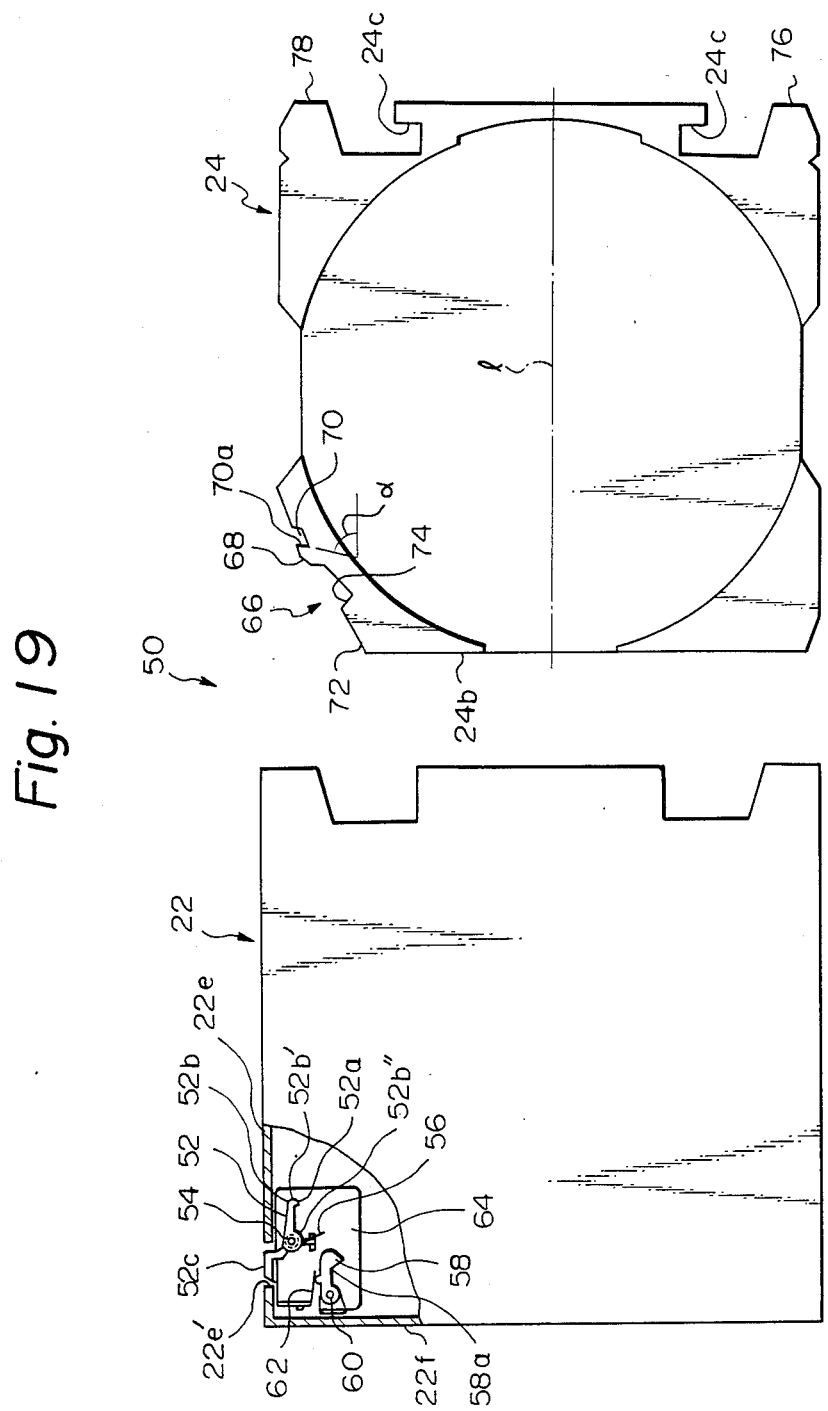
FIG. 19 is a plan view of a casing and a tray of the disk magazine as shown in FIG. 18, the casing being partly taken away to show its correspondence with the tray.
Figure 20:
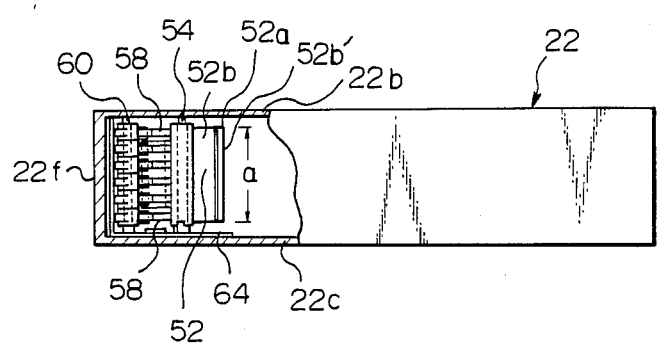
FIG. 20 is a partly taken away side elevation of the casing as shown in FIG. 18.

Referring to FIGS. 18 to 20, another embodiment of the present invention is shown. In the figures, the same or similar structural elements as those of the previous embodiment are designated by like reference numerals. As shown, a disk magazine 50 is provided with a lock lever 52 at its corner where the rear wall 22f and the side wall 22e of the casing 22 join each other. The lock lever 52 is rotatably mounted on a shaft 54 and provided with a width a which covers all of the trays 24 that may be received in the magazine 50. The lock lever 52 includes a first arm 52b having a pawl 52a at its end, and a second arm 52c exposed to the outside through a window 22e' which is formed through the casing side wall 22e. The arm 52b has a first tip 52b' and a second tip 52b'' and extends from the shaft 54 toward the opening 22a and, as will be described, serves to prevent the trays 24 from being inserted in an incorrect position with the first tip 52b'. Further, the lock lever 52 is constantly biased by a spring 56 in the clockwise direction as viewed in FIG. 19. Click lock arms 58 are provided in one-to-one correspondence with the tray receiving portions of the magazine 50 and rotatable independently of each other. Each click lock arm 58 has a pawl 58a at its end. Specifically, each click lock arm 58 is mounted on a shaft 60 and located in the vicinity of the lock lever 52 and adjacent to the casing rear wall 22f. A leaf spring 62 is associated with the clock lock arm 58 for constantly biasing it in the clockwise direction. The lock lever 52, click lock arms 58 and their associated elements stated so far are integrally mounted on a sheet meal 64 to constitute a subassembly.

As shown in FIGS. 18 and 19, the tray 24 in this particular embodiment is provided with a slant notch 66 at one of its four corners which is located at the front edge 24b with respect to the correct orientation of the tray 24 and faces the lock lever 52. In this configuration, the front edge 24b side of the tray 24 with respect to the correct orientation is asymmetrical with respect to the center line l which extends in the intended direction of tray insertion. In the notch 66 of the tray 24, a first recess 70 is contiguous with a slant 68, and a second recess 74 is contiguous with a slant 72. The first recess 70 includes a shoulder 70a which is placed at an angle of α which is smaller than 90 degrees relative to the center line l. The first and second recesses 70 and 74 are engageable with the pawl 52a of the lock arm 52 and the pawl 58a of the click lock arm 58, respectively.

Figure 21:
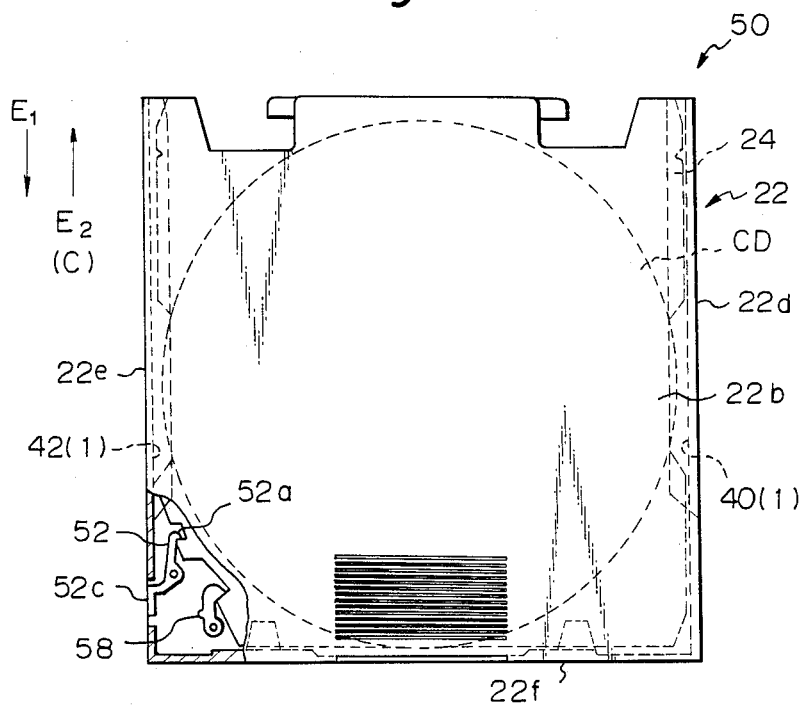
FIG. 21 is a plan view of the disk magazine of FIG. 18.
Figure 22:
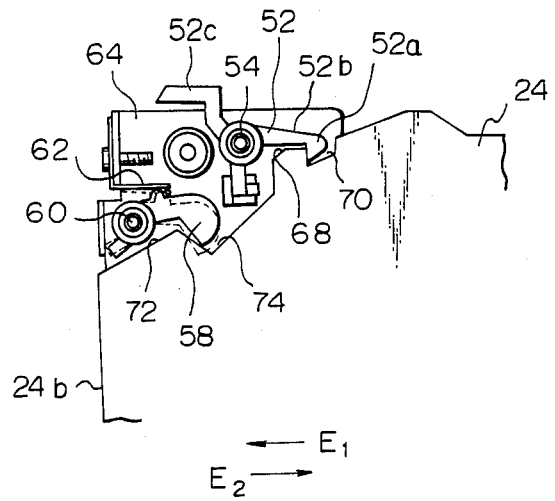
FIGS. 22 and 23 are views each showing the tray, a lock lever and a click lock arm in a particular relative position which occurs when the tray is inserted in a correct position.

The disk CD is loaded in the disk magazine 50 as follows. First, the disk CD is laid on the disk seat portion 24a of the tray 24, as shown in FIG. 18. Then, the tray 24 is inserted in its predetermined orientation into the casing 22 through the opening 22a, as indicated by the arrow $E_1$. Because it is the notch 66 that faces the lock lever 52, the tray 24 is allowed to advance to the deepest position in the casing 22 without being obstructed by the lock lever 52, as shown in FIGS. 21 as well as in FIG. 5. In such a position, as shown in FIGS. 21 and 22, the tray 24 is locked in position at its recess 70 by the pawl 52a of the lock lever 52 and at its recess 74 by the pawl 58a of the click lock arm 58a, whereby it is prevented from coming out of the casing 22. In this instance, the shoulder 70a of the recess 70 whose angle α is smaller than 90 degrees as previously stated further enhances the prevention of the slip-out of the tray 24.

Figure 23:
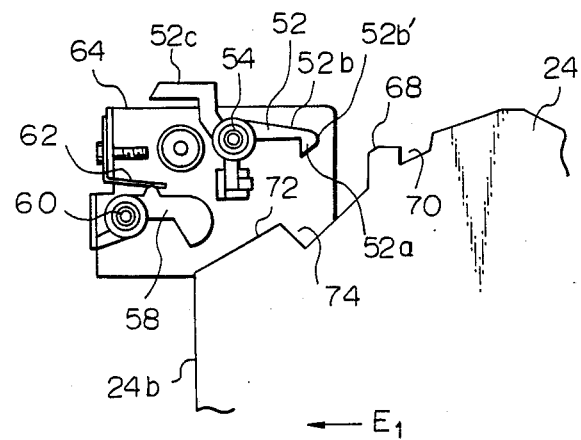

As shown in FIGS. 23, at the final stage of tray insertion, the slant 68 of the tray 24 abuts against the end of the lock lever 52 to urge it sideways, or counterclockwise, allowing the tray 24 to advance to the predetermined deepest position in the casing 22. The pawl 58a of the click lock arm 58 mates with the recess 74 of the tray 24 riding across the slant 68, whereby the tray 23 is pulled in the direction $E_1$ to precisely settle at its predetermined position.

The disk magazine 50 loaded with the disk CD as stated above is mounted in the playback device 26, as shown in FIG. 9. Then, the arm 52c of the lock lever 52 which is exposed to the outside is pressed inward to cause the lock lever 52 to rotate counterclockwise about the shaft 54 as viewed in FIG. 21. As a result, the pawl 52a of the lock lever 52 is released from the recess 70 of the tray 24. In this manner, each of the trays 24 is locked in position by its associated click lock arm 58 in a clicking fashion. In this condition, the mechanism 34, FIG. 9, may pull out any of the trays 24 through the opening 22a in the direction $E_2$ by retaining the notches 24c so as to mount the disk CD on the playback unit 36, FIG. 9.

Another role which the click lock arm 58 plays is preventing the tray 24 from slipping out from the casing 22 due to shocks and impacts while the playback device 26 is transported with the magazine 50 mounted therein.

A reference will be made to FIGS. 24 to 27 for describing the function assigned to the lock lever 52, i.e., preventing the tray 24 from being inserted in an incorrect position.

Figure 24:
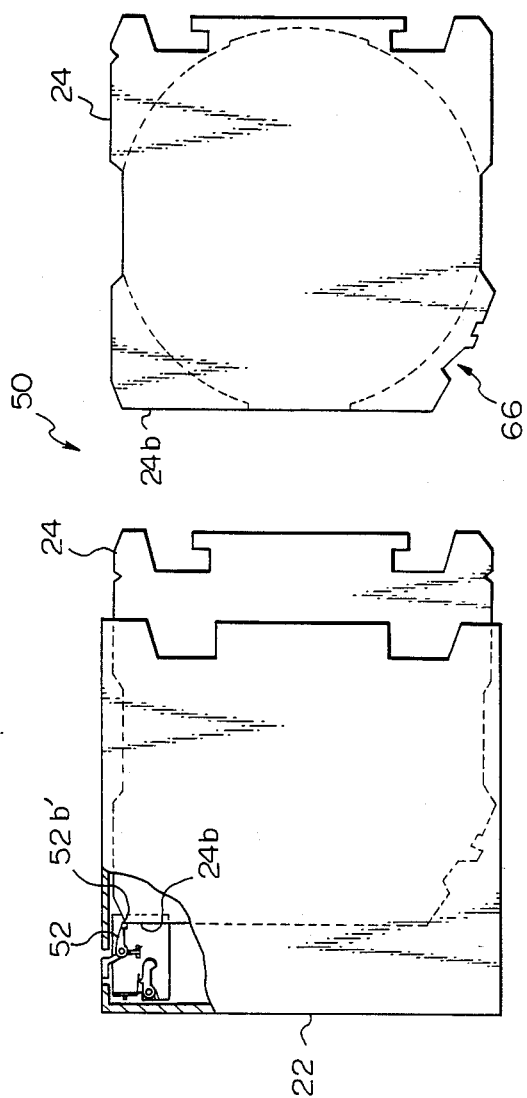
FIG. 24 is a view showing a condition in which the tray is inserted upside down.

FIG. 24 shows a condition in which the tray 24 is inserted into the casing 22 upside down. In this condition, the front edge 24b of the tray 24 abuts against the tip 52b' of the lock lever 52 so that the tray 24 is prevented from moving deeper into the casing 22 before fully received in the latter.

Figure 25:
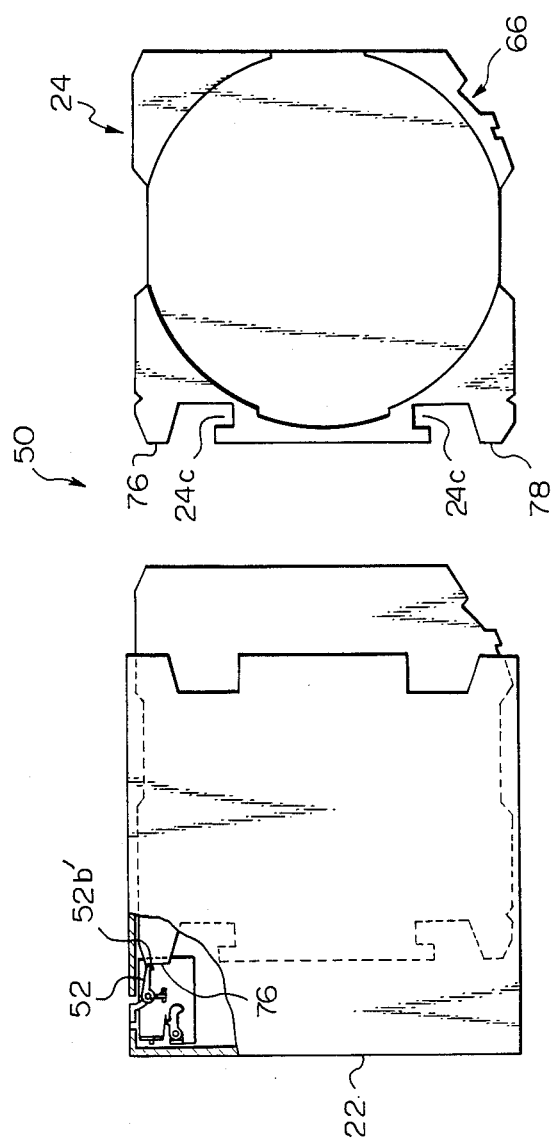
FIG. 25 is a view showing a condition in which the tray is inserted front side back.

In FIG. 25, the tray 24 is shown inserted front side back. In this case, the tray 24 collides against the tip 52b' of the lock lever 52 at one end 76 of its edge which is provided with the notches 24c and extends perpendicular to the intended direction of tray insertion. Hence, any further movement of the tray 24 into the casing 22 is inhibited.

Figure 26:
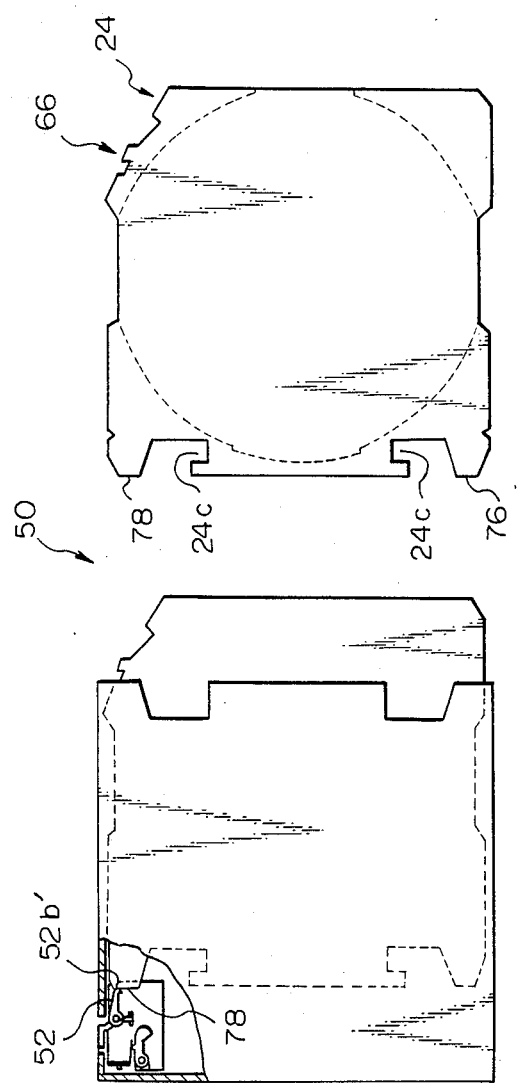
FIG. 26 is a view showing a condition in which the tray is inserted upside down and front side back.

In FIG. 26, the tray 23 is shown inserted upside down and front side back. As shown, the tray 24 is stopped when collided against the tip 52b' of the lock lever 52 at the other end 78 of the above-mentioned edge thereof.

Figure 27:
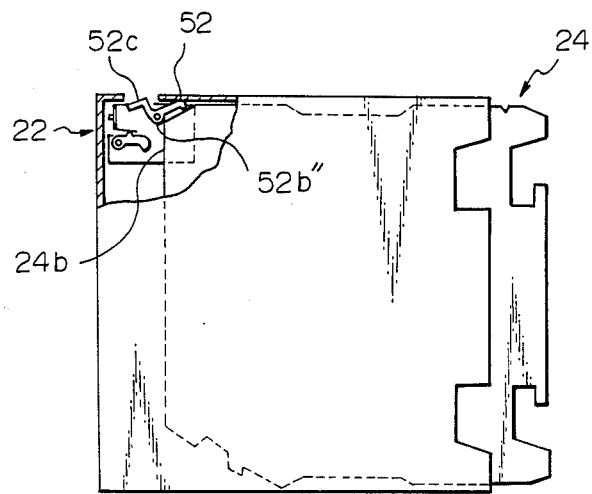
FIG. 27 is a view showing a condition in which the tray is inserted upside down while the lock lever is rotated.

Further, in FIG. 27, even if the tray 24 is inserted in any incorrect position after intentionally pushing the arm 52c of the lock lever 52 to rotate the lock lever 52 in the unlocking direction, the tray 24 collides against the base portion of the lever 52 and is thereby prevented from advancing any further.

In the manner described above, the lock lever 52 eliminates an occurrence that the tray 24 is moved to the predetermined deepest point in the casing 22 in an incorrect position. Specifically, when a person inserts the tray 24 into the casing 22 in any position other than the correct one, a part of the tray 24 remains protruded from the casing 22 alerting the person to the incorrect orientation of the tray 24 and, thereby, urging him or her to reposition it. This surely prevents the disk magazine 50 from being mounted in the playback device 26 with the tray 24 loaded therein in an incorrect position.

Further, because the lock lever 52 bifunctions as a member for protection the tray 24 against incorrect insertion as stated, the need for an exclusive member is eliminated to simplify the construction correspondingly.

In summary, it will be seen that the present invention provides a disk magazine which promotes the ease of operation since it is needless for a person to continuously support a casing of the magazine while loading a disk in the magazine, and prevents a tray from being damaged since the tray is not connected to the casing in an unstable manner. These advantages are derived from a unique construction in which the tray is bodily removable from the casing and, when removed, it becomes physically independent of the casing. The entry of dust and other particles hardly occurs since the casing is open at one side thereof only. The tray is moved into and out of the casing in a horizontal position guided by laterally opposite tray guides of the casing, safeguarding the disk from being rubbed during loading and unloading of the tray. Furthermore, the casing is provided with an incorrect insertion preventing member which, when the tray is inserted into the casing in any incorrect position such as inclined, upside down and/ or front side back, limits the movement of the tray halfway alerting a person to such an incorrect position of the tray. With such a member, therefore, the disk magazine is prevented from being mounted in a disk playback device with the tray loaded therein in an incorrect position to damage the playback device.

Various modofications will become possible for those skilled in the art after receiving the teachings of the present disclosure without departing from the scope thereof.

What is claimed is:
1. A disk magazine having a plurality of disk trays each carrying a disk in a coaxial disposition when said tray is properly inserted, said disk magazine being of the type which is mountable in a disk playback device which is operable to selectively play back the disks, comprising:
  a plurality of trays each having a disk seat portion for receiving a disk and each having a generally rectangular shape which includes four corner portions;

a magazine casing having a top and bottom wall along with opposed side walls and a back wall to thereby define an enclosed casing which is open at the front through which said disk-carrying trays are inserted in a disk-insertion direction, said casing having a plurality of tray guides disposed on the inside of each of said opposed side walls and arranged to receive disk-carrying trays inserted into said casing through said front opening, said trays being insertable into said casing into a fully inserted position when said tray is inserted into opposite aligned tray guides on said opposed side walls and when said tray is inserted into said opposite aligned tray guides in a desired orientation; and cooperable means on said casing and said trays for preventing said trays from being inserted into said fully inserted position when said trays have not been inserted into opposite aligned tray guides or when said trays have not been inserted into said casing in said desired orientation.

2. A disk magazine according to claim 1, wherein said cooperable means comprises engageable means on said back wall operable to engage said tray and prevent insertion of said tray into said fully inserted position when said tray is inserted into opposite non-aligned guides on said opposed side walls.

3. A disk magazine according to claim 1, wherein said cooperable means comprises engageable means on said back wall operable to engage said tray to prevent insertion of said tray into said fully inserted position when said tray is inserted into said casing in a disposition non-parallel to said bottom wall.

4. A disk magazine according to claim 2, wherein said engageable means comprises projecting lugs projecting into said casing from the inside surface of said back wall.

5. A disk magazine according to claim 4, wherein a plurality of spaced vertical rows of said projecting lugs are provided on said back wall.

6. A disk magazine according to claim 4, wherein said projecting lugs are spaced from the corners of said casing where said back wall meets said side walls.

7. A disk magazine according to claim 1, wherein each of said trays has a front end and a rear end, each of said trays also having a top and a bottom, said disk seat being disposed in said top of said tray, said tray being inserted into said casing in said desired orientation when said tray top faces upwardly and when said front end is the first-to-be-inserted end, said tray being inserted into said casing in an undesired orientation whenever said tray is inserted into said casing in any of a plurality of orientations other than said desired orientation.

8. A disk magazine according to claim 7, wherein said front end of said tray has one corner having a notch-forming means, said notch-forming means comprising a first recess, said casing having tray lock means operable to engage said first recess when said tray is inserted into said casing into said fully inserted position, said tray lock means being operable to engage said notch-forming means and prevent said tray from being inserted into said fully inserted position when said tray is inserted in at least one of said undesired orientations.

9. A disk magazine according to claim 8, wherein said cooperable means comprises engageable means on said back wall operable to engage said tray and prevent insertion of said tray into said fully inserted position when tray is inserted into opposite non-aligned guides on said opposed side walls, said engageable means being located in a position spaced from said notch-forming means when said tray is inserted into said casing into said fully inserted position.

10. A disk magazine according to claim 8, wherein said tray lock means comprises a pivotable lever, said pivotable lever having a front end portion engageable with said tray to prevent insertion of said tray into said casing into said fully inserted position when said tray is inserted into said casing while in one of said undesired orientations, said lever also having another portion spaced from said front end portion and engageable with said tray to prevent insertion of said tray into said fully inserted position when said tray is inserted into said casing while in another one of said undesired orientations.

11. A disk magazine according to claim 10, wherein said pivotal lever is pivotable between a locked and an unlocked position, said tray lock means further comprising biasing means biasing said lever into said locked position, said notch-forming means on said tray being operble to engage said lever and pivot said lever from said locked position to said unlocked position when said tray is being inserted into said casing into said fully inserted position, said first recess receiving an end portion of said lever when said tray has been inserted into said casing into said fully inserted position, said biasing means biasingly pivoting said lever from said unlocked position to said locked position when said end portion of said lever is received in said first recess when said trayis in said fully inserted position.

12. A disk magazine according to claim 10, wherein said lever and said first recess are constructed to preclude withdrawal of said tray from said casing in a direction opposite to said disk-insertion direction without first pivoting said lever from said locked to said unlocked position.

13. A disk magazine according to claim 8, wherein said notch-forming means comprises a second recess, said casing having click lock arm means enageable with said second recess when said tray has been inserted into said casing into said fully inserted position.

14. A disk magazine according to claim 13, wherein said click arm means comprises a pivotal click arm pivotable between a locked and an unlocked position, said click arm means further comprising biasing means biasing said click arm in said locked position, said notch-forming means on said tray being operble to engage said click arm and pivot said click arm from its locked to its unlocked position when said tray is being inserted into said casing into said fully inserted position, said second recess on said notch-forming means receiving an end portion of said click arm when said tray has been inserted into said casing into said fully inserted position, said biasing means pivoting said click arm from said unlocked position to said locked position when said end portion of said click arm has been received in said second recess when said tray has been inserted into said fully inserted position.

15. A disk magazine according to claim 14, wherein said click arm and said second recess are constructed to enable withdrawal of said tray from said casing in an opposite direction opposite to said disk-insertion direction in that movement of said tray in said opposite direction causes said recess to engage and pivot said click arm in opposition to the biasing force of said biasing means from said locked to said unlocked position.

16. A disk magazine having a plurality of disk trays each carrying a disk in a coaxial disposition when said tray is properly inserted, said disk magazine being of the type which is mountable in a disk playback device which is operble to selectively play back the disks, comprising:
- a plurality of trays each having a disk seat portion for receiving a disk and each having a generally rectangular shape which includes four corner portions;
- a magazine casing having a top and bottom wall along with opposed side walls and a back wall to thereby define an enclosed casing which is open at the front through which said disk-carrying trays are inserted, said casing having a plurality of tray guides disposed on the inside of each of said opposed side walls and arranged to receive disk-carrying trays inserted into said casing through said front opening;
- said plurality of tray guides on one side wall being spaced the same distance from one another as the corresponding spacing of the plurality of tray guides on the other of said side walls to thereby define an array of opposite aligned tray guides, said trays being insertable into said casing into a fully inserted position when said tray is inserted into opposite aligned tray guides on said opposed side walls; and
- means on said casing for preventing said trays from being inserted into said fully inserted position when said trays have not been inserted into opposite aligned tray guides.

17. A disk magazine having a plurality of disk trays each carrying a disk in a coaxial disposition when said tray is properly inserted, said disk magazine being of the type which is mountable in a disk playback device which is operable to selectively play back the disks, comprising:
- a plurality of trays each having a disk seat portion for receiving a disk and each having a generally rectangular shape which includes four corner portions;
- a magazine casing having a top and bottom wall along with opposed side walls and a back wall to thereby define an enclosed casing which is open at the front through which said disk-carrying trays are inserted, said casing having a plurality of tray guides disposed on the inside of each of said opposed side walls and arranged to receive disk-carrying trays inserted into said casing through said front opening;
- said plurality of tray guides on one side wall being spaced the same distance from one another as the corresponding spacing of the plurality of tray guides on the other of said side walls to thereby define an array of opposite aligned tray guides; said trays being insertable into said casing into a fully inserted position when said tray is inserted into said opposite aligned tray guides in a desired orientation; and
- means on said casing and said trays for preventing said trays from being inserted into said fully inserted position when said trays have not been inserted into said casing in said desired orientation.

* * * * *